United States Patent
Benegal et al.

(10) Patent No.: US 9,432,944 B1
(45) Date of Patent: Aug. 30, 2016

(54) DETERMINING WHETHER A MOBILE DEVICE USER IS SUBSTANTIALLY STATIONARY WITHIN A GEO-FENCE

(71) Applicant: KeepTrax, Inc., Irving, TX (US)

(72) Inventors: Kedarnath Benegal, Colleyville, TX (US); Ismail Thanickel, Frisco, TX (US)

(73) Assignee: KeepTrax, Inc., Irving, TX (US)

( * ) Notice: Subject to any disclaimer, the term of this patent is extended or adjusted under 35 U.S.C. 154(b) by 0 days.

(21) Appl. No.: 15/154,610

(22) Filed: May 13, 2016

Related U.S. Application Data

(60) Provisional application No. 62/175,233, filed on Jun. 13, 2015, provisional application No. 62/175,889, filed on Jun. 15, 2015, provisional application No. 62/180,116, filed on Jun. 16, 2015.

(51) Int. Cl.
*H04W 52/02* (2009.01)
*H04W 4/02* (2009.01)
*G01S 5/02* (2010.01)

(52) U.S. Cl.
CPC ........ *H04W 52/0254* (2013.01); *G01S 5/0252* (2013.01); *G01S 5/0278* (2013.01); *H04W 4/021* (2013.01); *H04W 4/027* (2013.01); *H04W 4/028* (2013.01)

(58) Field of Classification Search
USPC .............................................. 455/456.1–457
See application file for complete search history.

(56) References Cited

U.S. PATENT DOCUMENTS

| | | | |
|---|---|---|---|
| 8,725,569 B2 | 5/2014 | Liang et al. | |
| 8,892,461 B2 | 11/2014 | Lau et al. | |
| 8,948,781 B2 | 2/2015 | Wang et al. | |
| 8,958,822 B2 | 2/2015 | Liang et al. | |
| 9,037,199 B1* | 5/2015 | Stogaitis | H04W 52/0254 455/456.1 |
| 9,037,485 B2 | 5/2015 | Fu et al. | |
| 9,161,294 B2* | 10/2015 | Teague | H04W 48/16 |
| 9,225,789 B2* | 12/2015 | Jensen | H04L 51/32 |
| 9,307,399 B2* | 4/2016 | Nicosia | H04W 8/245 |
| 9,332,411 B2* | 5/2016 | Kansal | H04W 4/001 |
| 2012/0214513 A1* | 8/2012 | Hashimoto | H04W 64/006 455/456.2 |
| 2013/0084882 A1* | 4/2013 | Khorashadi | H04L 67/22 455/456.1 |
| 2013/0179107 A1* | 7/2013 | Setoguchi | H04M 1/72569 702/94 |
| 2014/0287783 A1* | 9/2014 | Czompo | H04W 4/027 455/456.6 |
| 2015/0045068 A1* | 2/2015 | Soffer | H04W 4/025 455/456.3 |
| 2015/0334532 A1* | 11/2015 | Christie | H04W 52/0261 455/456.6 |

* cited by examiner

*Primary Examiner* — Steven Kelley
(74) *Attorney, Agent, or Firm* — David H. Judson

(57) ABSTRACT

A technique to determine whether a mobile device is in a "substantially stationary" state or a "substantially moving" state (e.g., with respect to a geo-fence in which the device may be within). These states are possible "motion" states associated with the mobile device. Preferably, the determination leverages a data table that includes a defined set of states (either "substantially stationary," "substantially moving" or "no change") associated with various transitions of the mobile device from, on the one hand, a "last reported activity" and, on the other hand, a currently-determined "probable activity." Preferably, the new motion state is the substantially stationary state when the probable activity is relatively slower than last-reported activity, irrespective of whether the mobile device is in true motion. On the other hand, the new motion state is the substantially moving state when the probable activity is relatively faster than the last-reported activity.

18 Claims, 5 Drawing Sheets

| | UNKNOWN | STILL | FOOT | WALKING | RUNNING | BIKING | VEHICLE | TILTING |
|---|---|---|---|---|---|---|---|---|
| UNKNOWN | NONE | STATIONARY | STATIONARY | STATIONARY | MOVING | MOVING | MOVING | NONE |
| STILL | NONE | NONE | MOVING | MOVING | MOVING | MOVING | MOVING | NONE |
| FOOT | NONE | STATIONARY | NONE | NONE | NONE | MOVING | MOVING | NONE |
| WALKING | NONE | STATIONARY | NONE | NONE | MOVING | MOVING | MOVING | NONE |
| RUNNING | NONE | STATIONARY | NONE | NONE | NONE | MOVING | MOVING | NONE |
| BIKING | NONE | STATIONARY | STATIONARY | STATIONARY | NONE | NONE | MOVING | NONE |
| VEHICLE | NONE | STATIONARY | STATIONARY | STATIONARY | NONE | NONE | NONE | NONE |
| TILTING | NONE | STATIONARY | NONE | NONE | NONE | MOVING | MOVING | NONE |

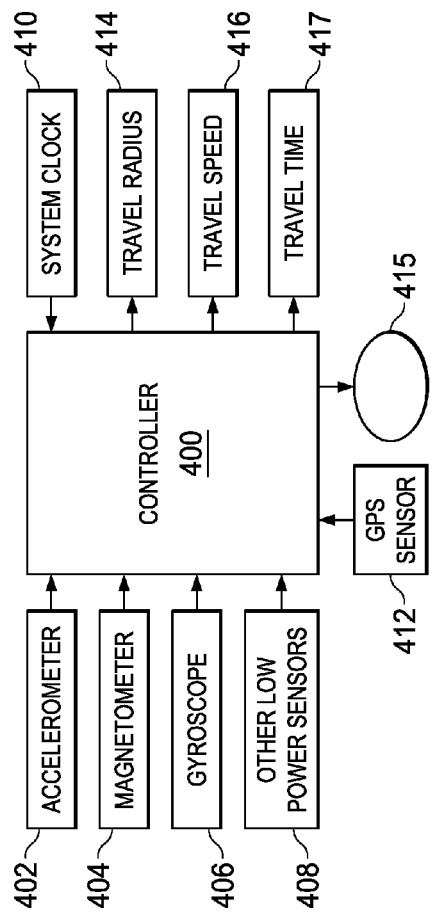

FIG. 4

| | UNKNOWN | STILL | FOOT | WALKING | RUNNING | BIKING | VEHICLE | TILTING |
|---|---|---|---|---|---|---|---|---|
| UNKNOWN | NONE | STATIONARY | STATIONARY | STATIONARY | MOVING | MOVING | MOVING | NONE |
| STILL | NONE | NONE | MOVING | MOVING | MOVING | MOVING | MOVING | NONE |
| FOOT | NONE | STATIONARY | NONE | NONE | NONE | MOVING | MOVING | NONE |
| WALKING | NONE | STATIONARY | NONE | NONE | MOVING | MOVING | MOVING | NONE |
| RUNNING | NONE | STATIONARY | NONE | STATIONARY | NONE | MOVING | MOVING | NONE |
| BIKING | NONE | STATIONARY | STATIONARY | STATIONARY | NONE | NONE | MOVING | NONE |
| VEHICLE | NONE | STATIONARY | STATIONARY | STATIONARY | NONE | NONE | NONE | NONE |
| TILTING | NONE | STATIONARY | NONE | NONE | NONE | MOVING | MOVING | NONE |

FIG. 5

```
Receive Activity Confidences from Activity Monitor
Subroutine Process Activity Confidences
    For each activity in Activity Confidences array
        Calculate the elapsed time by subtracting activity time from current time
        Multiply the elapsed time by the activity confidence value
        Add the resulting value to the State Confidences array for the given activity
        If the state time value for the activity is zero
            Save the current time to State Confidences array
        End If
        Clear the value in Activity Confidences for activity
    End for
End
Subroutine Save Activity Confidences
    For each detected activity from the Activity Monitor
        Store the activity time
        Store the activity confidence
    End for
End
Subroutine Predict Probable Activity
    Initialize probable activity confidence to zero
    Initialize probable activity to UNKNOWN
    Initialize probable activity time 0

For each activity in the State Confidences array
        Calculate the elapsed time by subtracting the activity time from current time
        Divide the state confidence value of the activity by the elapsed time
        This will give the time weighted average confidence value for the activity If the weighted average is higher than the probable state
            Set probable activity confidence to weighted average
            Set probable activity time to activity time
            Set probable activity to activity
        End If
    End for Return probable activity
End
Subroutine Predict Substantial State: probable activity
    From the State Confidences array get the value for probable activity
    Calculate the elapsed time between state time for probable activity and current time If elapsed time is greater the minimum qualification time for the activity
        Read the last reported activity from memory If the reported activity is not same as the probable activity
            Lookup state from Activity Transition Table on reported and probable activity If the table value is NONE
                Clear State Confidences and wait for next activity
            Else if the state value is not same as the reported state
                Clear State Confidences array
                Save reported state
                Report looked up state
            End If End If End If
End
```

FIG. 7

DETERMINING WHETHER A MOBILE DEVICE USER IS SUBSTANTIALLY STATIONARY WITHIN A GEO-FENCE

BACKGROUND

1. Technical Field

The subject matter relates generally to "location-based" services. More specifically, the subject matter is in the area of determining the location of the user, e.g., by detecting whether a user is substantially stationary within a geo-fence.

2. Description of Related Art

Before the advent of the GPS sensor-enabled devices, it was difficult to determine the exact location of a user even when the user was stationary. The advancements in smartphones (and other mobile devices) with GPS sensors have made it possible to determine the location of the user without user intervention. That said, currently-available solutions require the GPS sensor of the mobile device to be turned ON all the times to determine the location of the user, even when the user is stationary. Keeping the GPS sensor turned on reduces the battery life of the phone, often making the device unusable after just a few hours. Indeed, the burden associated with finding a power source, often in the very middle of the day, may also lead the user to proactively turn off the GPS sensor on the smartphone, thus rendering location-based services unavailable.

BRIEF SUMMARY

The subject matter herein provides for a technique to determine whether a mobile device (and thus the user associated with the mobile device) is in a "substantially stationary" state or a "substantially moving" state (e.g., with respect to a geo-fence in which the device may be within). These states are possible "motion" states associated with the mobile device.

Preferably, the determination (of motion state) leverages a data table that includes a defined set of states (either "substantially stationary," "substantially moving" or "no change") associated with various transitions of the mobile device from, on the one hand, a "last reported activity" and, on the other hand, a currently-determined "probable activity." The last reported (or then-current) activity is the activity that triggered a last reported state ("substantially stationary" or "substantially moving" or "no change") for the device. In the data table, the defined set of states are indexed as a matrix, with a first index (e.g., a row) being the last reported activity, and the second index (e.g., a column) being the probable activity. In operation, the mobile device is monitored, preferably using one or more low power sensors on the device, to provide data from which an indication of the "probable activity" is determined. Once the probable activity for the device is determined, it is used as index into the data table. The other index into the table is the last reported activity that triggered the then-current motion state. By cross-referencing these indices, a "new motion state" (for the probable activity) is derived from the data table. That "new motion state" output from the data table lookup is then compared to the last reported state to determine whether the new motion state is "substantially stationary" or "substantially moving," or "no change."

Preferably, the new motion state is the substantially stationary state when the probable activity is relatively slower than last-reported activity, irrespective of whether the mobile device is in true motion. On the other hand, the new motion state is the substantially moving state when the probable activity is relatively faster than the last-reported activity.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 4 depicts a controller that determines a substantially stationary state according to this disclosure;

FIG. 5 depicts a representative activity transition lookup table that is used to facilitate the determination of the device's motion state (e.g., within the geo-fence);

FIG. 7 depicts a representative pseudocode implementation of the controller functions in FIG. 6.

DETAILED DESCRIPTION

As used herein, the following terms have the following meanings:

A "geo-fence" is a virtual barrier. Programs and mechanisms that incorporate geo-fencing allow an administrator to set up triggers when a device enters (or exits) the boundaries defined by the administrator.

A GPS sensor is a high power sensor that detects the signals from the GPS satellites to determine the coordinates of a mobile device.

A "Point of Interest" (POI) is a location or place a user or other may find interesting.

A "PIN" is a combination of a GPS coordinates, entry time to the geo fence, and exit time to the geo-fence. A PIN is sometimes referred to as a "User-visit PIN."

Figure 1:
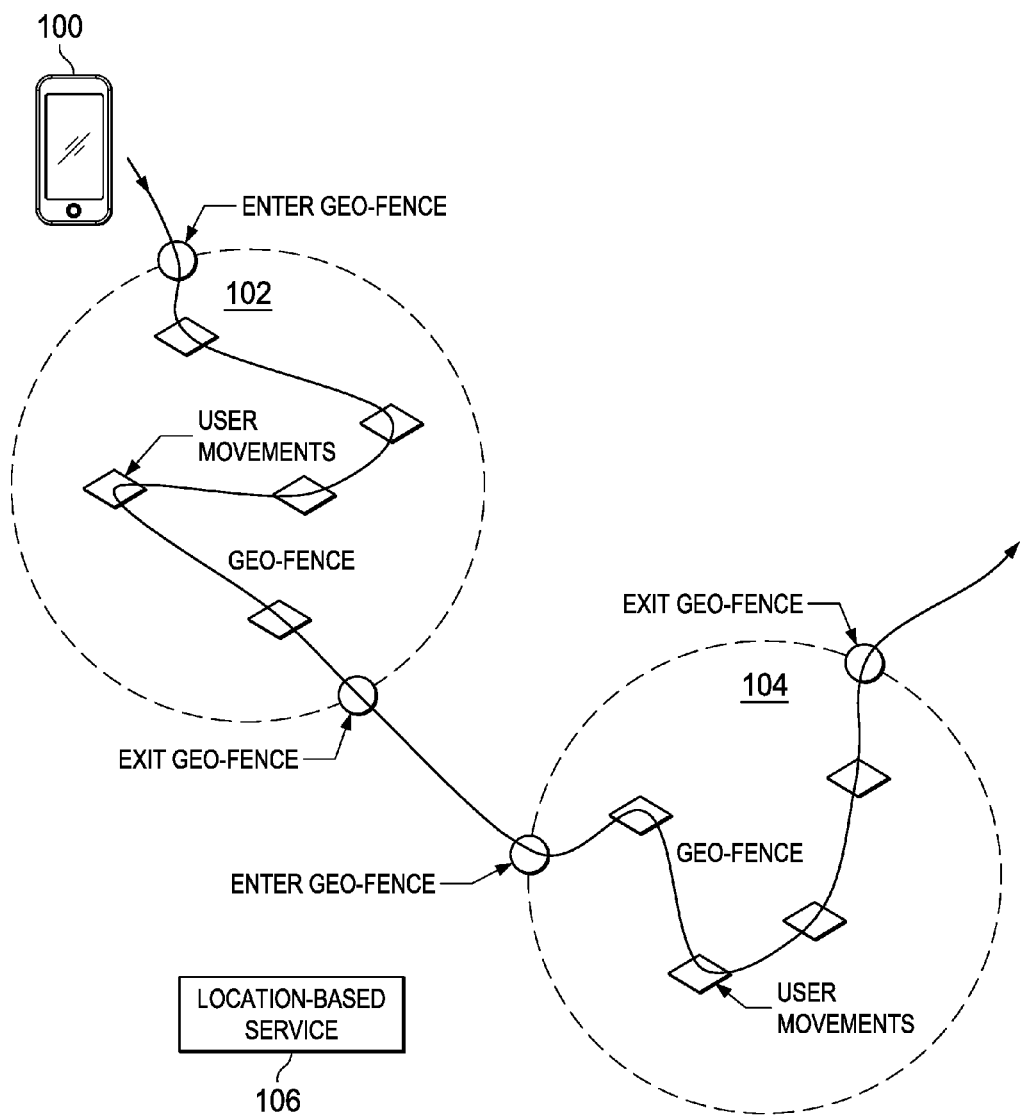
FIG. 1 describes a state diagram of a user entering and exiting multiple geo-fences.

FIG. 1 depicts the notion of a mobile device 100 moving (together with the user) with respect to one or more geo-fences, here geo-fence 102, and geo-fence 104. As is well-known, a geo-fence is a virtual perimeter for a real-world geographic area. A geo-fence may be dynamically generated, as in a radius around a point location, or a geo-fence can be a predefined set of boundaries. The use of a geo-fence is called geo-fencing, and one example of usage involves a location-aware device (such as the user's mobile device) interacting with a location-based service (LBS) 106, which can track the user entering or exiting a geo-fence as depicted.

Figure 2:
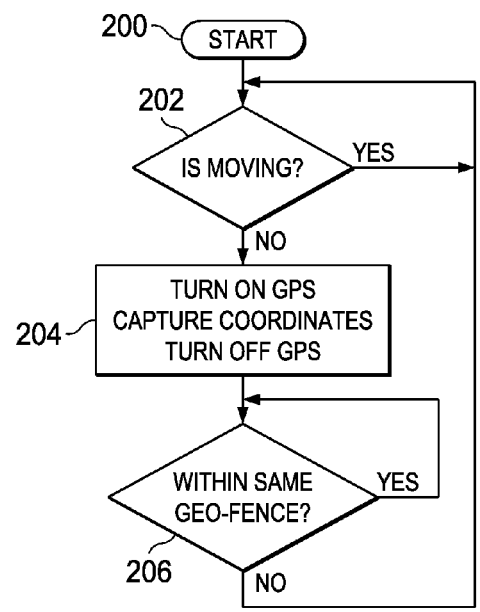
FIG. 2 shows a high level process flow that is used to determine a substantially stationary state of a mobile device.

FIG. 2 depicts the basic operation of a mobile device controller that determines whether the mobile device is "substantially stationary" or "substantially moving" with a geo-fence. The adverb "substantially is used herein to indicate that the notions of "stationary" and "moving" are relative characterizations and do not necessarily imply absolute requirements of "at rest" or actual physical translation.

Indeed, given the nature of the algorithm described below, a mobile device may be found to be substantially stationary even when the device is in actual physical movement. As will be described, the characterization of the device's motion state is based on the activity associated or determined for the device including a "probable activity" that is determined presently, and a last reported activity corresponding to the activity that triggered a last-reported motion state. A "last reported" activity or motion state (as the case may be) may also be considered to be a "then-current" or current one.

The establishment and maintenance of the geo-fence are not aspects of this disclosure, as such techniques are well-known and are carried out by the location-based service without necessarily interacting with the mobile device. The mobile device is assumed to execute a mobile application (or "app") that provides the functionality of this disclosure. Moreover, the device motion state determination function described herein may be practiced for reasons other than determining the device's relative state within a geo-fence. That said, the geo-fencing application is described herein as a use case for convenience.

The technique begins at step 200. At step 202, a test is performed to determine if the mobile device is substantially stationary or moving. The details of a preferred technique for performing this determination are described below. If the mobile device is moving, the routine cycles as depicted. If, however, the mobile device is determined to be substantially stationary, the routine continues at step 204 to turn ON the device GPS (if not already ON) and capture the device's GPS coordinates (location). A test is then performed at step 206 to determine whether the device location (as captured) is still within the geo-fence. If so, the routine cycles (because the device has not exited the geo-fence). If, however, the outcome of the test at step 206 is negative, the device has exited the geo-fence, and control routines to step 202.

Figure 3:
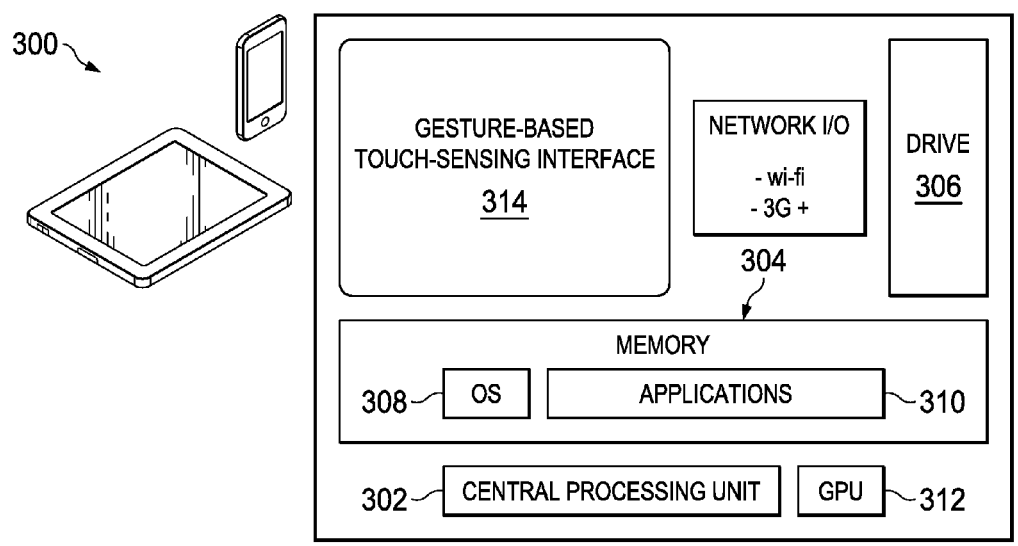
FIG. 3 is an exemplary block diagram of a mobile device in which the method of the disclosure is implemented.

A representative mobile device is a smartphone or tablet. As seen in FIG. 3, the device 300 comprises a CPU (central processing unit) 302, such as any Intel- or AMD-based chip, computer memory 304, such as RAM, and a drive 306. The device software includes an operating system (e.g., Apple iOS) 308, and generic support applications and utilities 310. The device may also include a graphics processing unit (GPU) 312 and various low power sensors as will be described. In particular, the mobile device also includes a touch-sensing device or interface 314 configured to receive input from a user's touch and to send this information to processor 312. The touch-sensing device typically is a touch screen. The touch-sensing device or interface 314 recognizes touches, as well as the position, motion and magnitude of touches on a touch sensitive surface (gestures). In operation, the touch-sensing device detects and reports the touches to the processor 312, which then interpret the touches in accordance with its programming. Typically, the touch screen is positioned over or in front of a display screen, integrated with a display device, or it can be a separate component, such as a touch pad. The touch-sensing device is based on sensing technologies including, without limitation, capacitive sensing, resistive sensing, surface acoustic wave sensing, pressure sensing, optical sensing, and/or the like. The touch-sensing can be based on single point sensing or multipoint sensing. Single point sensing is capable of only distinguishing a single touch, while multi-point sensing is capable of distinguishing multiple touches that occur at the same time. The touch-sensing can include actual contact of the touch-sensing device, near-touch of the touch-sensing device (e.g. detecting hovering), or remote detection of the user by the touch-sensing device.

FIG. 4 depicts a controller (typically software executing in a hardware processor) that performs the substantially stationary determination according to this disclosure, and the various inputs it receives and generates. As depicted, controller 400 receives inputs from various low power device sensors, such as accelerometer 402, magnetometer 404, gyroscope 406, and other low power sensors 408. The controller 400 also receives as input the system clock 410, and GPS data from a GPS sensor 412, although preferably the GPS sensor preferably is not used to determine the motion state of the device. The controller 400 outputs the substantially stationary/moving determination itself 415, as well as various other data, such as travel radius 414, travel speed 416, and travel time 418. As noted above, preferably, the system monitors the low power sensors on the device to determine whether the device is substantially stationary by detecting motion of the device. The sensors 402, 404, 406 and 408 use very little battery power compared to the GPS sensor 412.

Once it is determined that the mobile device is substantially stationary for a pre-defined amount of time, the GPS sensor 412 (if it was not already ON), is turned ON until an accurate location is captured by the GPS sensor. Preferably, the controller 400 automatically turns off the GPS sensor 412 (if it was turned ON) once the location is captured to save the battery power of the mobile device. Further, and as depicted in FIG. 2, the controller 400 returns to monitoring motion using the low power sensors to determine whether user's mobile device has left the pre-defined or automatically determined geo-fence radius. Once the mobile device has left the geo-fence or entered a new one, it may again be tracked for substantially stationary state.

The following provides additional details regarding a preferred technique for determining whether the mobile device is substantially stationary or substantially moving (as the case may be).

By way of background, preferably a set of "activities" are defined for the mobile device (or the user). These may include, without limitation: unknown (activity is unknown or cannot be determined reliably); still (device is staying still without moving); walking (device is moving at walking speed); running (device is moving at running speed); biking (device is moving at biking speed); vehicle (device moving at speed of an automobile; and tilting (device is in tilting state, such as the user playing a game). There may be additional states defined (including transitional ones), and the particular nomenclature is not intended to be limiting. Preferably, the particular activities are associated with one another in an activity transition lookup table, such as depicted in FIG. 5. The values in the table are defined as a set of "from" and "to" values as determined by viewing the "from" activities as defined in the left-most column against the "to" activities as defined in the top row. The left-most column corresponds to a "last reported activity" (namely, the one that triggered the last reported or current motion state). The top row corresponds to a "probable activity" that is determined (using the process flow in FIG. 6).

Thus, for example, and considering the table in FIG. 5 as an example, when moving from an "unknown" state to a "walking" state, the device is considered "stationary." When moving from a "walking" state to a "running" state, the device is considered "moving," and so forth, as indicated by the table values. The activity transition lookup table is stored in (or otherwise retrievable to) the mobile device, and (as will be described in more detail below) it facilitates a prediction of whether the mobile device is substantially stationary or substantially moving. The entry "none" in data table refers to the "no change" scenario.

In one embodiment, the table is created according to the following rules (or assumptions): (1) when the device is moving from a lower speed to higher speed activity, the device is said to be substantially moving, and (2) when the device is slowing down in speed, the device is considered to be substantially stationary even if the device is not completely still. Thus, the particular activities and the relative transitions (relationships) along with other data captured by the low power sensors facilitates a determination regarding whether the mobile device is or is not substantially stationary. While the above rules are preferred, others may be implemented depending on the use case.

Thus, the activity transition lookup table data shown in FIG. 5 may be adjusted for different devices and use cases.

Figure 6:
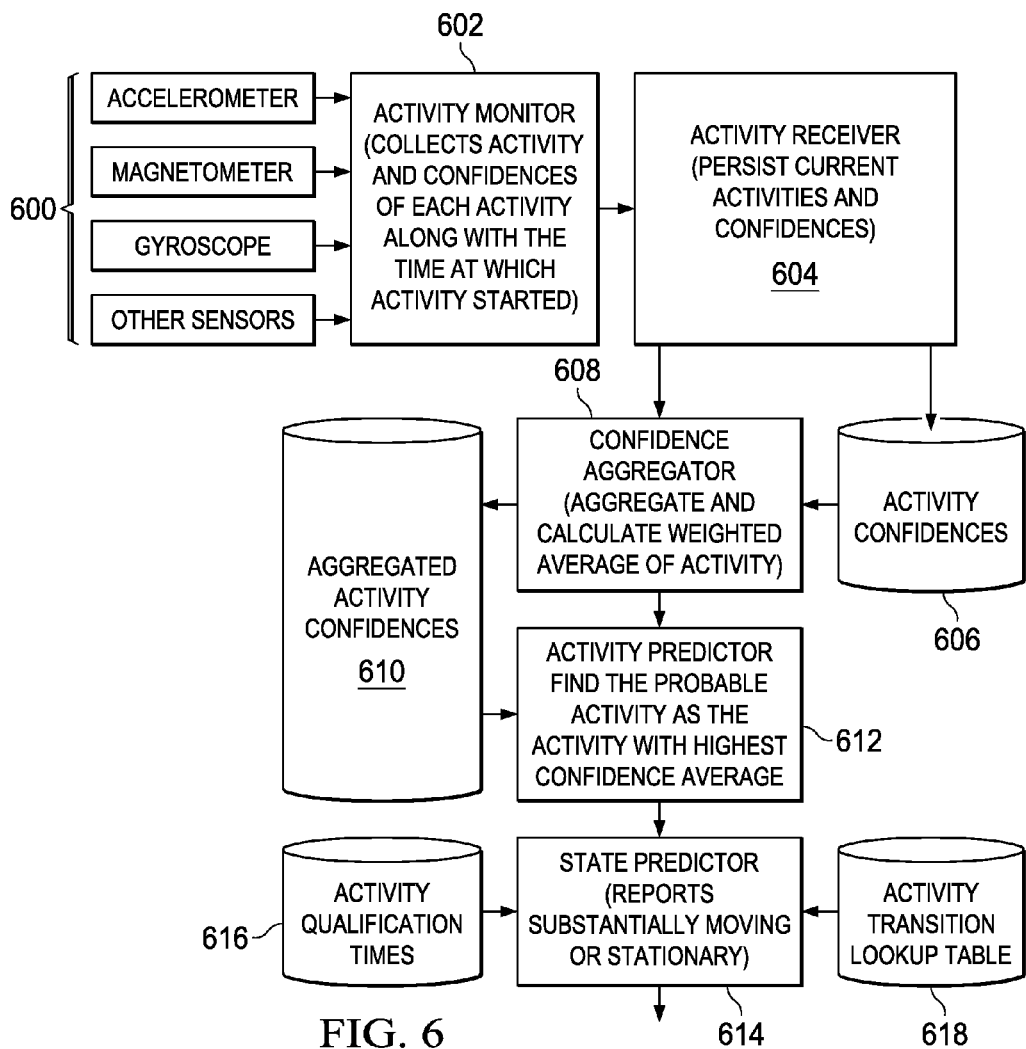
FIG. 6 depicts the functions of the controller in additional detail.

FIG. 6 depicts a process flow for a preferred controller routine for determining whether the device is substantially stationary or substantially moving (or no change) according to this disclosure. As described, the device includes a set of one or more low power sources 600 that generate data that is monitored by the controller. To this end, activity monitor 602 collects data from the low power sensors 600 and reports probable activities of the mobile device based on that collected data. Preferably, activity monitor 602 reports activity states with a confidence value, e.g., ranging from 1-100. Activity monitor 602 also collects a time that a particular activity starts. The activity monitor may operate continuously, periodically, synchronously or asynchronously (e.g., upon a predetermined event or condition).

As depicted, and whenever there is a change in activity, activity monitor 602 reports the change(s) to an activity receiver 604. The activity receiver 604 collects the activities and their confidences (as reported by the activity monitor) and persists this information (along with the time of each activity) to an activity confidences database 606. The activity confidences database stores the confidence values that are reported by the activity monitor 602, and preferably these values are kept until a next activity set of activity confidences are received by the activity receiver 604. When that occurs, the values of activity confidences in the activity confidences database are replaced by the newly reported values and persisted along with current time. The stored activity confidences (in the activity confidences database) are used to calculate a weighted confidence average for an activity to determine substantial state. In particular, and as depicted, a confidence aggregator 608 aggregates the confidences for each activity that are received by the activity receiver multiplied by the duration that the activity was in force. In this operation, previously stored values of the activity confidences are multiplied by a time difference between current time and the time at which the activity confidences were saved. The output of the confidence aggregator (the aggregated activity) is then added to the existing values and persisted back in a state confidences database 610 as a set of state confidences. State confidences (as stored in the state confidences database 610) represent the aggregate value of the activity confidences multiplied by the time interval of each activity. This value is persisted and updated until a new probable activity is reported. This information is then used for determining the probable activity and for determining the substantial motion state of the mobile device.

To that end, an activity predictor 612 takes the aggregated confidence values of each activity since the last time a substantially stationary or moving state was reported. The aggregate value for each activity is divided by the total duration of the activity to calculate the weighted average confidence value of each activity. The activity with highest average is then reported as the probable activity. As depicted, the output of the activity predictor 612 is provided to a state predictor 614. The state predictor 614 uses the probable activity reported by the activity predictor 612 to decide whether the user's mobile device is substantially stationary or moving. The state predictor 614 also receives as input the activity transition lookup table, and a set of activity qualification times stored in an activity qualification times database 616. The activity qualification time database 616 stores the minimum duration an activity must be happening for it to qualify for being considered to be an activity that would contribute to determining substantial stationary or substantial motion state of the user's mobile device. The state predictor 614 first checks whether a minimum qualification time required for the probable activity is met. If not, the probable activity is discarded. If, however, the minimum required qualification time interval is met, the state predictor 614 uses a last reported activity with substantial motion or stationary, and compares it with the probable activity using the information in the activity transition lookup table 618. The lookup table provides the data that enables the state predictor to determine either there is no change in the substantial state of the user's mobile device or that the mobile device is substantially stationary or substantially moving. After this determination, the state confidences are cleared. The state predictor 614 then outputs the determination to end the process. FIG. 7 is a pseudocode representation of this algorithm (© 2016, Keeptrax, Inc., all rights reserved).

The databases described and depicted may be combined in whole or in part, and the information may be structured in any convenient manner.

The various processing functions (the activity monitor, the activity receiver, the confidence aggregator, the activity predictor and the state predictor) may be combined in whole or in part, and the nomenclature attached to the functions should not be taken as limiting. Typically, these functions are implemented as sets of computer program instructions that are loaded into memory and executed in the mobile device processor. These operations (or any of them) may be carried out continuously, periodically, synchronously or asynchronously (e.g., upon a predetermined event or condition).

As noted above, once the system determines whether the mobile device is substantially stationary (i.e., not moving) within a particular geo-fence, the GPS sensor is turned off (if needed) and geo-location data for the POI is captured.

Optionally, the controller may then provide one or more additional functions. One such function is a determination of whether to "mark" a geo-location that has been determined by the above-identified monitoring process. In particular, once the controller detects the mobile device of the user is substantially stationary at a geo-fence, the system may use a whitelist and/or blacklist to compare the geo-fence GPS coordinate with radius, POI names, a category of the POI names in that geo-fence, or other information, to decide whether a PIN is recorded. In this regard, the controller may also include the capability to store, change and retrieve a whitelist (e.g., of geo-fence coordinates, POI names, POI categories, or any other identifiable information about a geo-fence), to store, change and retrieve a blacklist (e.g., of geo-fence coordinates, POI names, POI categories, or any other identifiable information about a geo-fence), and to automatically use the stored whitelist or blacklist to decide whether a PIN should be recorded at a geo-fence where the user is substantially stationary. Thus, the technique herein may be extended to record (by PIN dropping) the substantially stationary state of the user's mobile device within a geo-fence by comparing geo-fence data with user- or system-configurable whitelists or blacklists.

According to a further aspect, a User-visit (PIN) is defined a user arriving at a POI and leaving the POI, preferably after spending a minimum predefined amount of time at the POI. A PIN typically has the geographical coordinates of the location, entry time, exit time and time of the day in the local time.

Another function that the controller may perform is an automatic recording of the visit to the geo-fence, together with associated data curation for later on-demand retrieval by the user. To that end, once the controller detects the substantially stationary state of a device and captures the location of the device, it may also capture as well as all or some information (related to the determined location data) as collected from that location and available about that location from internal and third party sources. This information may include "user-data," "relevant-data" and "spatial data." The phrase "user-data" is anything that is generated by the user at a POI with or without using tools and or apparatus during a user-visit. User-generated content includes but is not limited to user's opinion about the POI such as star rating, comments, photos, videos, notes, etc. The phrase "relevant-data" is the information collected from the user such as from user's mobile device and other information previously provided by the user for this POI group or time or group of people during a user-visit. This includes, without limitation, calendar events, attendee list, event names, etc. The term "spatial-data" is the information that is collected from POI and that is not directly-related to the user happening at the time of user-visit. This includes, without limitation, other visitors, owners, other events, employees, service providers, availability of services, and other POIs near the POI. Spatial-data also includes data from third party sources.

According to further aspects, preferably a user-visit (PIN) is calculated when there is no significant change (i.e., the device is substantially stationary) within the user's geo-fence. The time at which there is no significant change in the user's location (entering the geo-fence) for a predefined interval preferably is recorded and stored as the entry time. The time of the day in local time is calculated and recorded as well. The location coordinates from GPS are recorded as the location of the PIN. When there is again a significant change in the user's location, information is recorded as the exit time of the PIN. Name, category and other details about the POI are retrieved using the location coordinates, with such retrieval preferably leveraging third party location services such as Google® Places. Preferably, every PIN has a unique visit-id associated with it. Any relevant-data that is available with the user's mobile device and other devices are recorded and they are connected with the visit-id of the user-visit (PIN). If configured to do so, the system automatically attaches user-data from one or more other sources, such as a dedicated still camera, a dedicated video camera, one or more IOT devices, the Internet, third party data sources, and other sources. The visit-id of the user-visit (PIN) preferably is associated with each of this user-data. All prior PINs of a particular POI and associated data preferably are automatically retrieved and made available to the user when the user is visiting the POI again. All user-visits (PINs) to all Groups of POIs to which this POI belong are provided to the user for optional retrieval. The user can share (e.g., shared with other users for a predefined amount of time) one or more user-visits with selected data that are associated with user-visit PIN. Shared information is made automatically available to the recipient and at the end of the expiry time preferably the shared information is automatically removed from recipient.

POIs typically have several attributes, such as category to which they belong, name of the POI, the geographical location, hours of operation, size, and the like. POIs can be grouped by one or more different attributes. POIs that belong to a particular category such as coffee shops, can be grouped as one. POIs that have the same name, such as Starbucks®, can be grouped as one. POIs that are in a geo fence, such as a mall, can be grouped as one. POIs that belong to another POI in various locations can be grouped as one, like Starbucks in Galleria Malls. POIs can be grouped using a combination of attributes. A POI can belong to one or multiple groups.

The subject matter described herein provides significant advantages. The approach enables an automatic determination of a substantially stationary state of a user without using the GPS sensor of the mobile device, preferably by detecting motion. The approach also enables the GPS sensor to be ON automatically (if not already ON) once the user is substantially stationary so that the GPS coordinates of the user can then be automatically captured. The GPS sensor can then be turned OFF automatically to save the device battery once the GPS coordinates are captured. The approach also enables an automatic determination whether the user has left the geo-fence, preferably by detecting motion using non-GPS low power sensor(s).

This disclosure describes a technique to determine the substantially stationary state of a user's mobile device within a given geo-fence without using the high power GPS sensor of the mobile device.

The mobile device may be a smartphone, tablet or wearable (e.g., Apple iPhone® and iPad® tablet, iWatch™, Google® Glass™, and others), an IoT device or appliance, or the like. Such a device comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

In the preferred embodiment, the mobile device includes one or more non-GPS low-power sensors, as described above. These include the gyroscope, which is a sensor that detects the orientation of the mobile device, the accelerometer, which is a sensor that determines acceleration of the mobile device, the magnetometer, which is a sensor that measures the magnetic field at a point in space, and an ambient light sensor, which is a sensor that detects the ambient light that is falling on the mobile device screen.

A representative end user mobile device comprises a CPU (central processing unit), such as any ARM processor or Intel- or AMD-based chip, computer memory, such as RAM, and a drive (e.g., Flash-based). The device software includes an operating system (e.g., Apple iOS, Google® Android™, or the like), and generic support applications and utilities. The device may also include a graphics processing unit (GPU). In particular, the mobile device also includes an input device or interface configured to receive input from a user's touch or other gesture, and to send this information to processor. The input device typically is a touch screen, but this is not a limitation. The input device or interface recognizes sensory inputs, such as touches or other gestures, as well as the position, motion and magnitude of inputs on the user interface. The device also includes network I/O support to support network transport (WiFi, 3G+). In operation, the touch-sensing device detects and reports the touches to the processor, which then interpret the touches in accordance with its programming. Typically, the touch screen is positioned over or in front of a display screen, integrated with a display device, or it can be a separate component, such as a touch pad. The touch-sensing device is based on sensing technologies including, without limitation, capacitive sensing, resistive sensing, surface acoustic wave sensing, pressure sensing, optical sensing, and/or the like. Other data input mechanisms, such as voice recognition, may be utilized in the device.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The underlying network transport may be any communication medium including, without limitation, cellular, wireless, Wi-Fi, small cell (e.g., Femto), and combinations thereof.

The mobile app of this disclosure may be a native application, a functionality of a third party application, or a standalone app that may be downloaded and installed on the device via a mobile application delivery service, such as the Apple® App™ Store, Google Play Store, or the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Nomenclature references herein should be deemed explanatory and not necessarily limited in scope unless otherwise dictated by the context.

The technique herein provides for an improvement to mobile device location determination technologies, as well as improvements to other technologies such as location based services.

Having described our invention, what is claimed is as follows:

1. A method to determine a motion state of a mobile device, comprising:

storing a data table that includes a first index, a second index, and set of table values, the set of table values being a defined set of motion states that include a substantially stationary state of the mobile device, a substantially moving state of the mobile device, and a no change state, the first index and the second index of the data table cross-referencing a last reported activity and a probable activity selected from a set of activities representing relative degrees of movement of the mobile device, the last reported activity having triggered a last reported motion state for the mobile device, the last reported activity being indexed by the first index, and the probable activity being indexed by the second index;

receiving data and determining a probable activity of the mobile device, wherein the probable activity has a confidence value associated therewith;

indexing into the data table using the last reported activity in the first index and the probable activity in the second index to determine a new motion state for the mobile device, the new motion state being defined by the data table value stored at an intersection of data table values as determined by the first index and the second index;

comparing the new motion state to the last reported motion state to characterize the new motion state as substantially stationary or substantially moving or no change, the new motion state being characterized as substantially stationary when the probable activity is relatively slower than the last reported activity, irrespective of whether the mobile device is in true motion, and the new motion state being characterized as substantially moving when the probable activity is relatively faster than the last reported activity; and upon a determination from indexing into the data table that the new motion state of the mobile device is substantially stationary, determining, using a whitelist or a blacklist, whether to associate a marker with a geo-location of the mobile device.

2. The method as described in claim 1 wherein the data is received from one or more low power sensors of the mobile device.

3. The method as described in claim 1 wherein the set of activities representing relative degrees of movement of the mobile device are: still, foot, walking, running, biking, vehicle and tilting.

4. The method as described in claim 1 further including activating a GPS sensor and recording geo-location data.

5. The method as described in claim 4 further including de-activating the GPS sensor following recording of the geo-location data.

6. The method as described in claim 4 further including collecting information associated with a geo-fence in which the geo-location data is determined to be within.

7. A computer program product in a non-transitory computer-readable storage media, the computer program product comprising a set of computer program instructions stored in memory and executed by a hardware processor to carry out operations to determine a motion state of a mobile device, the operations comprising:
    storing a data table that includes a first index, a second index, and set of table values, the set of table values being a defined set of motion states that include a substantially stationary state of the mobile device, a substantially moving state of the mobile device, and a no change state, the first index and the second index of the data table cross-referencing a last reported activity and a probable activity selected from a set of activities representing relative degrees of movement of the mobile device, the last reported activity having triggered a last reported motion state for the mobile device, the last reported activity being indexed by the first index, and the probable activity being indexed by the second index;
    receiving data and determining a probable activity of the mobile device, wherein the probable activity has a confidence value associated therewith;
    indexing into the data table using the last reported activity in the first index and the probable activity in the second index to determine a new motion state for the mobile device, the new motion state being defined by the data table value stored at an intersection of data table values as determined by the first index and the second index;
    comparing the new motion state to the last reported motion state to characterize the new motion state as substantially stationary or substantially moving or no change, the new motion state being characterized as substantially stationary when the probable activity is relatively slower than the last reported activity, irrespective of whether the mobile device is in true motion, and the new motion state being characterized as substantially moving when the probable activity is relatively faster than the last reported activity; and
    upon a determination from indexing into the data table that the new motion state of the mobile device is substantially stationary, determining, using a whitelist or a blacklist, whether to associate a marker with a geo-location of the mobile device.

8. The computer program product as described in claim 7 wherein the data is received from one or more low power sensors of the mobile device.

9. The computer program product as described in claim 7 wherein the set of activities representing relative degrees of movement of the mobile device are: still, foot, walking, running, biking, vehicle and tilting.

10. The computer program product as described in claim 7 wherein the operations further include activating a GPS sensor and recording geo-location data.

11. The computer program product as described in claim 10 wherein the operations further include de-activating the GPS sensor following recording of the geo-location data.

12. The computer program product as described in claim 10 wherein the operations further include collecting information associated with a geo-fence in which the geo-location data is determined to be within.

13. A mobile device, comprising:
    a hardware processor;
    one or more low power sensors;
    computer memory storing computer program instructions that perform operations to determine and report a motion state of the mobile device, the operations comprising:
        storing a data table that includes a first index, a second index, and set of table values, the set of table values being a defined set of motion states that include a substantially stationary state of the mobile device, a substantially moving state of the mobile device, and a no change state, the first index and the second index of the data table cross-referencing a last reported activity and a probable activity selected from a set of activities representing relative degrees of movement of the mobile device, the last reported activity having triggered a last reported motion state for the mobile device, the last reported activity being indexed by the first index, and the probable activity being indexed by the second index;
        receiving data and determining a probable activity of the mobile device, wherein the probable activity has a confidence value associated therewith;
        indexing into the data table using the last reported activity in the first index and the probable activity in the second index to determine a new motion state for the mobile device, the new motion state being defined by the data table value stored at an intersection of data table values as determined by the first index and the second index;
        comparing the new motion state to the last reported motion state to characterize the new motion state as substantially stationary or substantially moving or no change, the new motion state being characterized as substantially stationary when the probable activity is relatively slower than the last reported activity, irrespective of whether the mobile device is in true motion, and the new motion state being characterized as substantially moving when the probable activity is relatively faster than the last reported activity; and
        upon a determination from indexing into the data table that the new motion state of the mobile device is substantially stationary, determining, using a whitelist or a blacklist, whether to associate a marker with a geo-location of the mobile device.

14. The mobile device as described in claim 13 wherein the data is received from one or more low power sensors of the mobile device.

15. The mobile device as described in claim 13 wherein the operations further include activating a GPS sensor and recording geo-location data.

16. The mobile device as described in claim 15 wherein the operations further include de-activating the GPS sensor following recording of the geo-location data.

17. The mobile device as described in claim 15 wherein the operations further include collecting information associated with a geo-fence in which the geo-location data is determined to be within.

18. The mobile device as described in claim 13 wherein the set of activities representing relative degrees of movement of the mobile device are: still, foot, walking, running, biking, vehicle and tilting.

* * * * *